Dec. 18, 1945.   C. C. STUART   2,391,363
TRANSPORT VEHICLE
Filed Aug. 7, 1942   5 Sheets-Sheet 1
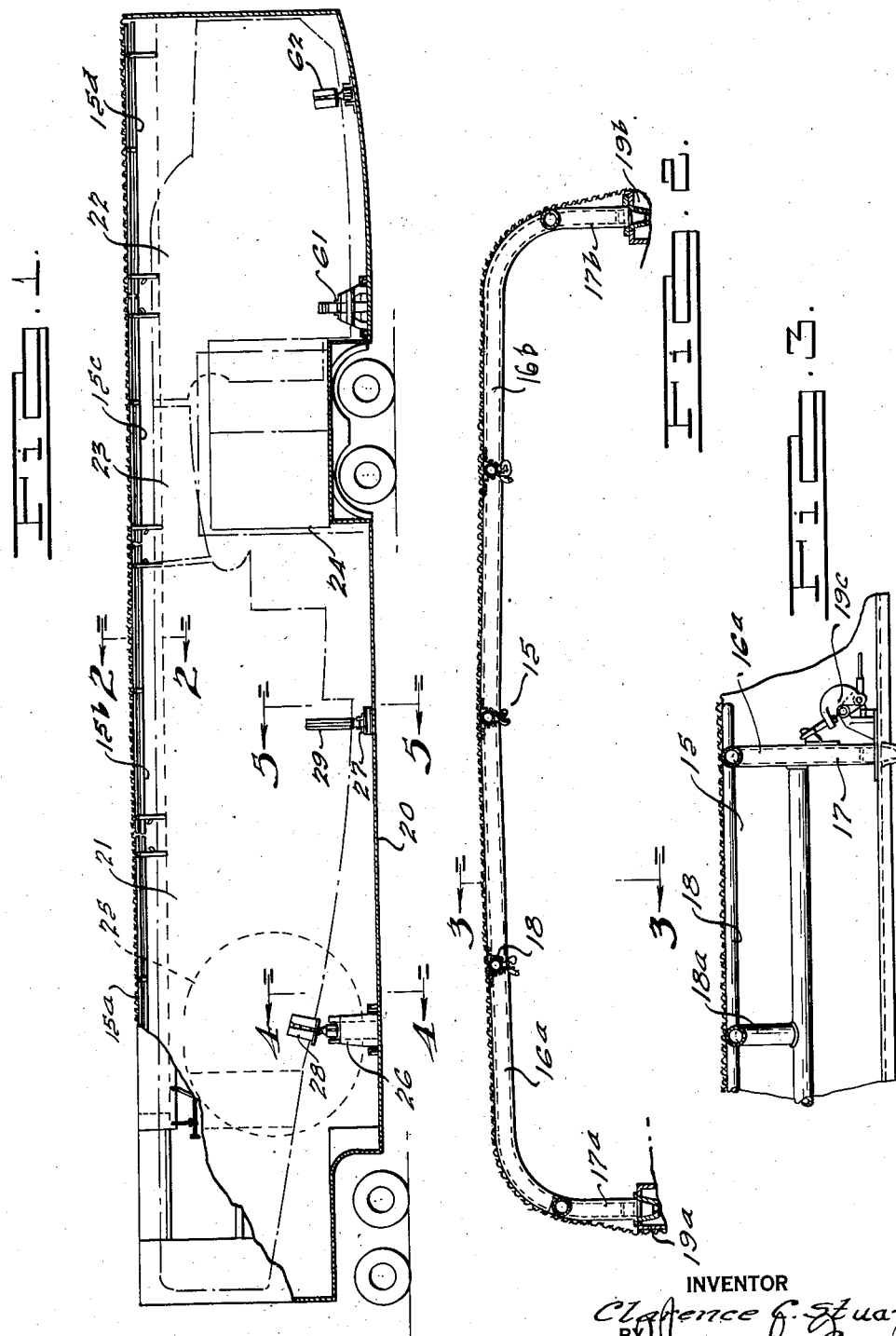
INVENTOR
Clarence C. Stuart.
BY Joseph Farley
ATTORNEY Dec. 18, 1945.   C. C. STUART   2,391,363
TRANSPORT VEHICLE
Filed Aug. 7, 1942   5 Sheets-Sheet 2

INVENTOR
Clarence C. Stuart.
BY Joseph Narley
ATTORNEY

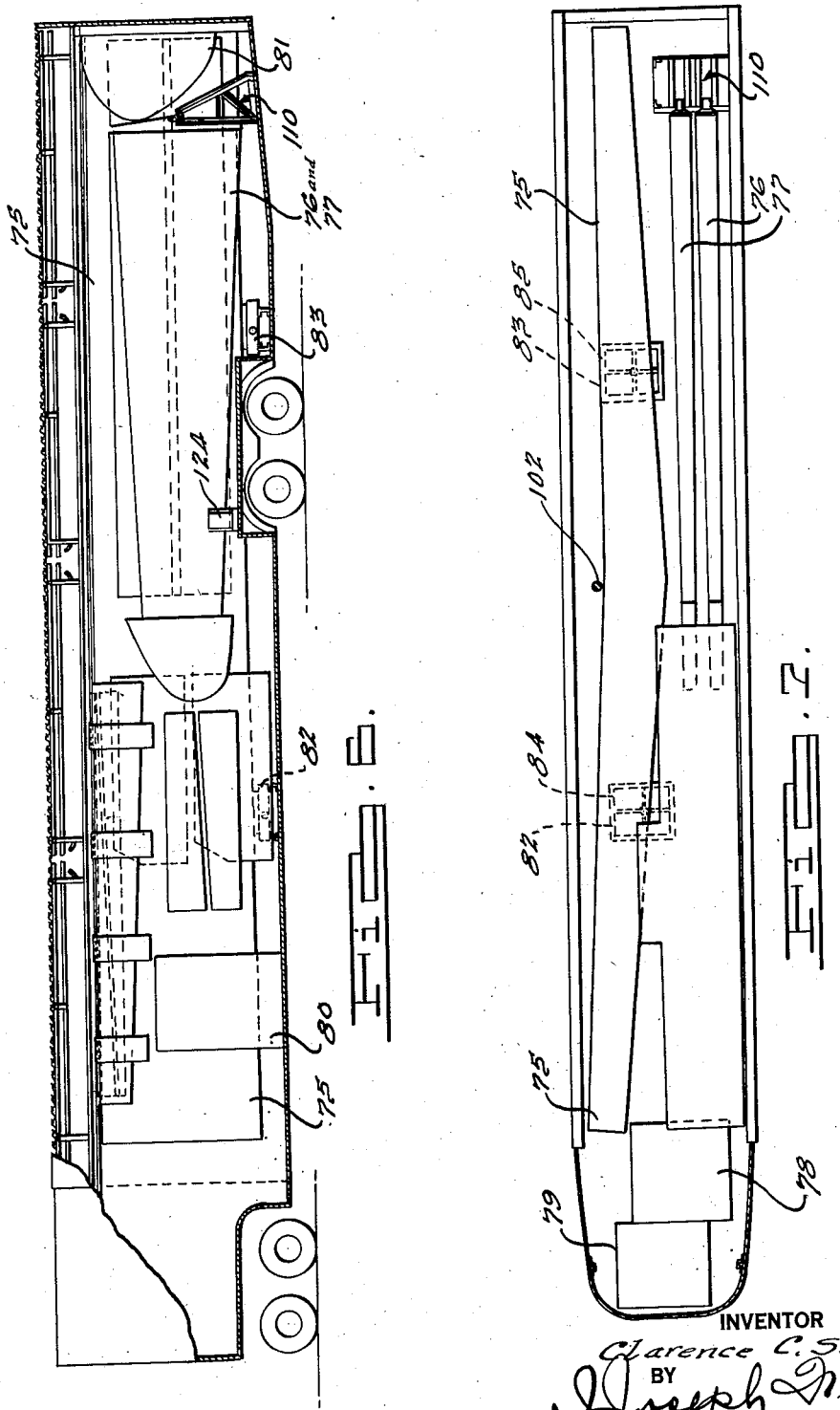

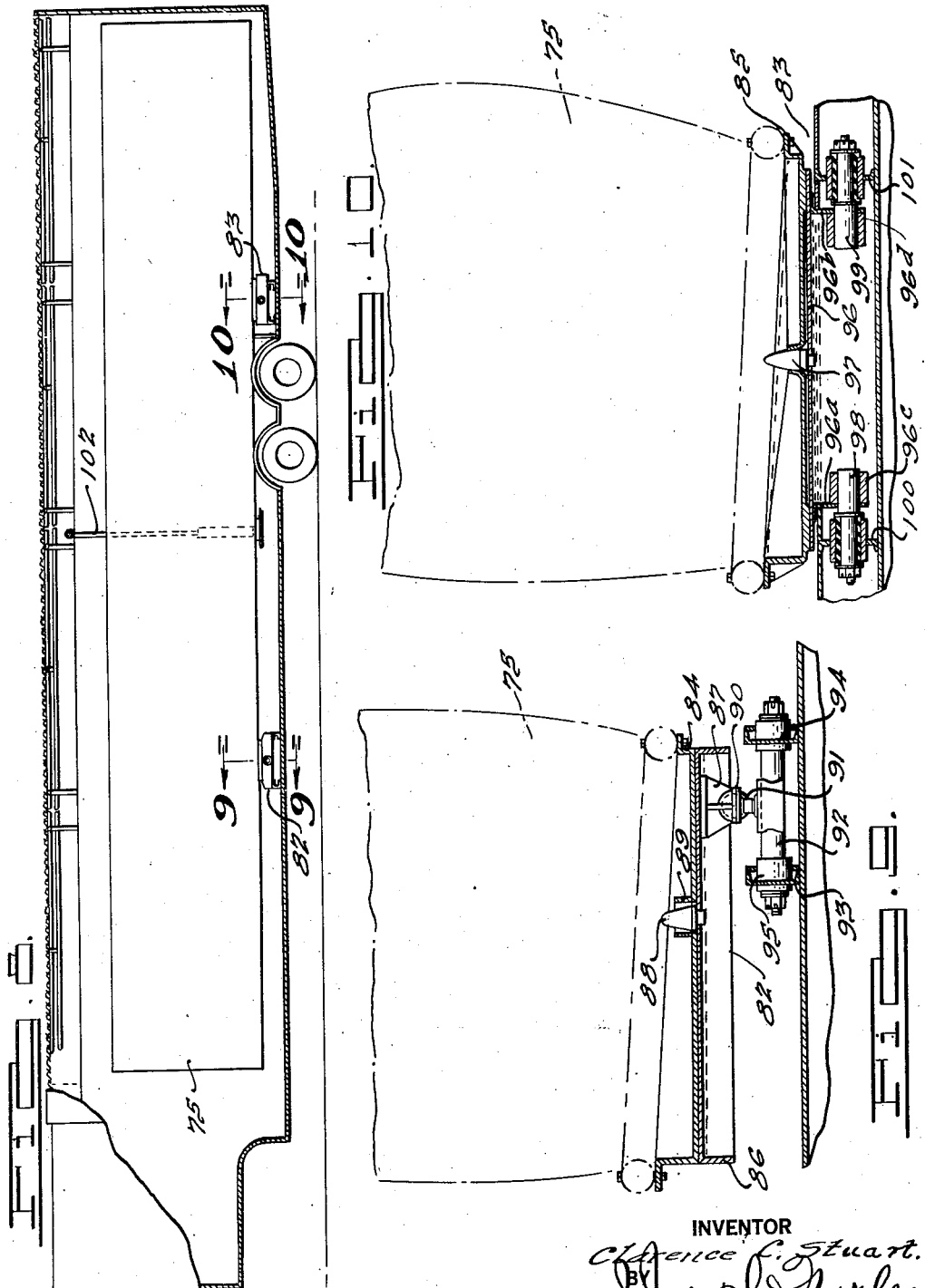

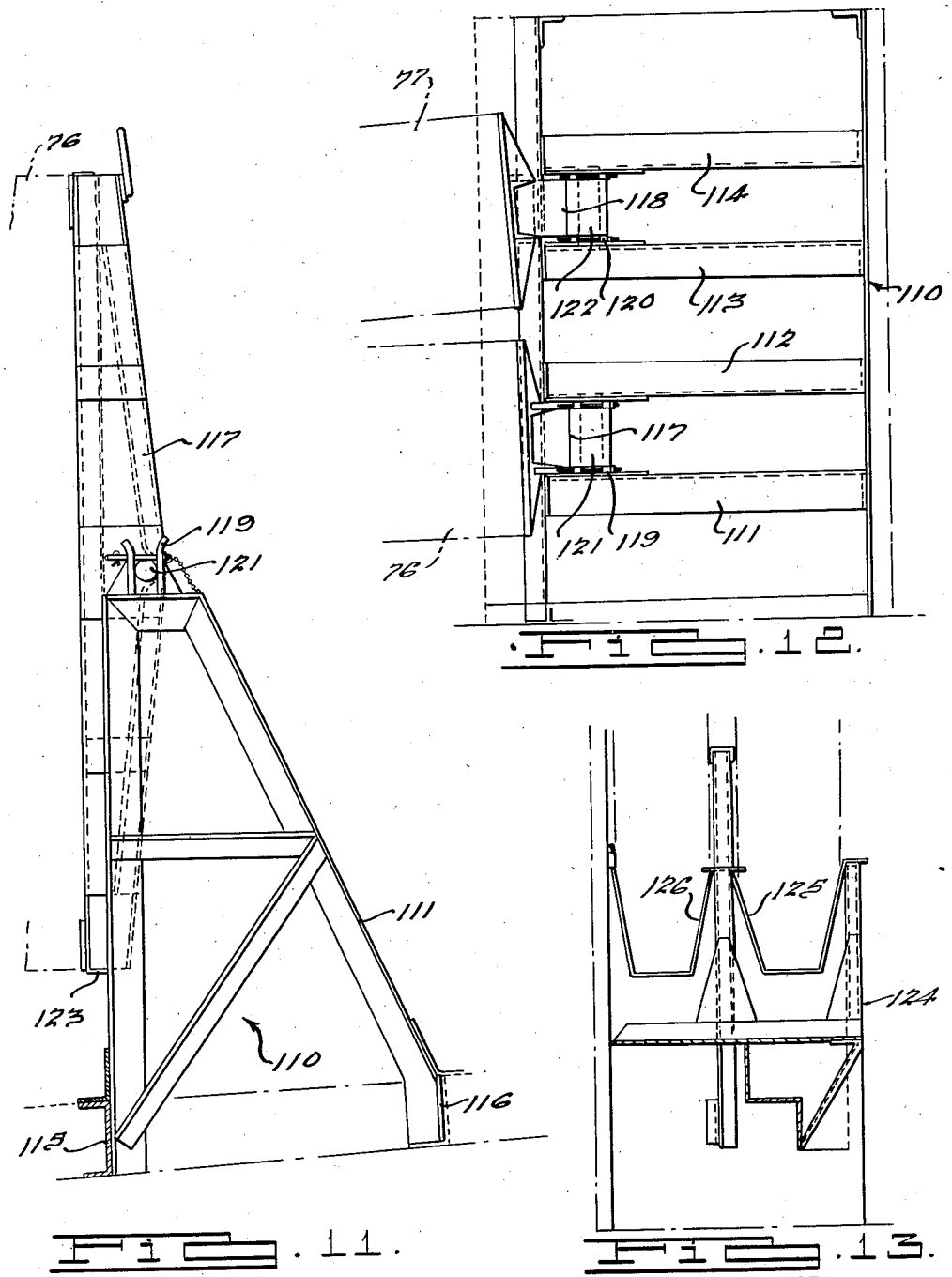

Patented Dec. 18, 1945

2,391,363

UNITED STATES PATENT OFFICE 2,391,363

TRANSPORT VEHICLE

Clarence C. Stuart, Pontiac, Mich., assignor to Mechanical Handling Systems, Inc., Detroit, Mich., a corporation of Michigan Application August 7, 1942, Serial No. 453,935

6 Claims. (Cl. 248—119)

This invention relates to equipment for transporting relatively large assembled units and the equipment herein illustrated is particularly designed for the transportation of airplanes which have been assembled into so-called sub-assembly units.

In the manufacture of airplanes it has in some instances been found advantageous to complete the manufacture of separate units of the airplane in different parts of the country and to ship the completed sub-assemblies to one place to be assembled together as a completed airplane. Even where the sub-assemblies for completing an entire plane are built at one place, it is sometimes advantageous to ship them to another plant or field to be finally assembled. However, when shipping large structures such as fuselage, wings and other parts, it is very important that these relatively large units be carried in such a way that they are not distorted or twisted during transport thus rendering them unfit for assembly into a completed airplane when they arrive at their destination. It is evident also that it would not be practical to thus transport the sub-assemblies if a large amount of loose packing material and other equipment were required which would necessitate an expenditure of an excessive amount of time and labor in mounting and packing the units for transportation.

It is therefore a primary object of the invention to provide a transportation vehicle for carrying relatively large sub-assembly units with a minimum number of mountings and supports which will enable the units to be carried without distortion or breakage.

It is a further object to provide means for transportation enabling units carried to be adequately supported and held in place without the use of excessive amount of loose packing and supporting equipment requiring time and labor for manipulation.

The above and other objects of the invention appear more fully in the following more detailed description and by reference to the accompanying drawings forming a part hereof and wherein:

Fig. 1 is a side elevation of a trailer showing a structure for supporting and carrying fuselage parts of an airplane;

Fig. 2 is a section taken on the line 2—2 of Fig. 1 which shows a cross section through the top or roof structure of the trailer;

Fig. 3 is a section taken on the line 3—3 of Fig. 2 which shows a longitudinal section through the roof structure;

Fig. 6 is a sectional view through a trailer like that shown in Fig. 1 but with supports for carrying wing parts of an airplane;

Fig. 7 is a plan view of the trailer shown in Fig. 6 showing disposition of various parts therein;

Fig. 8 is another sectional view through the trailer shown in Fig. 6 wherein the section is taken near the center of the trailer and shows the support for the center section portion of the wing;

Fig. 9 is a section taken on line 9—9 of Fig. 8 which shows one of the supports for the wing center section;

Fig. 10 is a section taken on line 10—10 of Fig. 8 which shows the other support for the wing center section;

Fig. 11 is a view of the support mounting for securing the outer wing panels for transportation;

Fig. 12 is the top view of the support shown in Fig. 11;

Fig. 13 is a view of another support for the outer wing panels.

Figure 4:
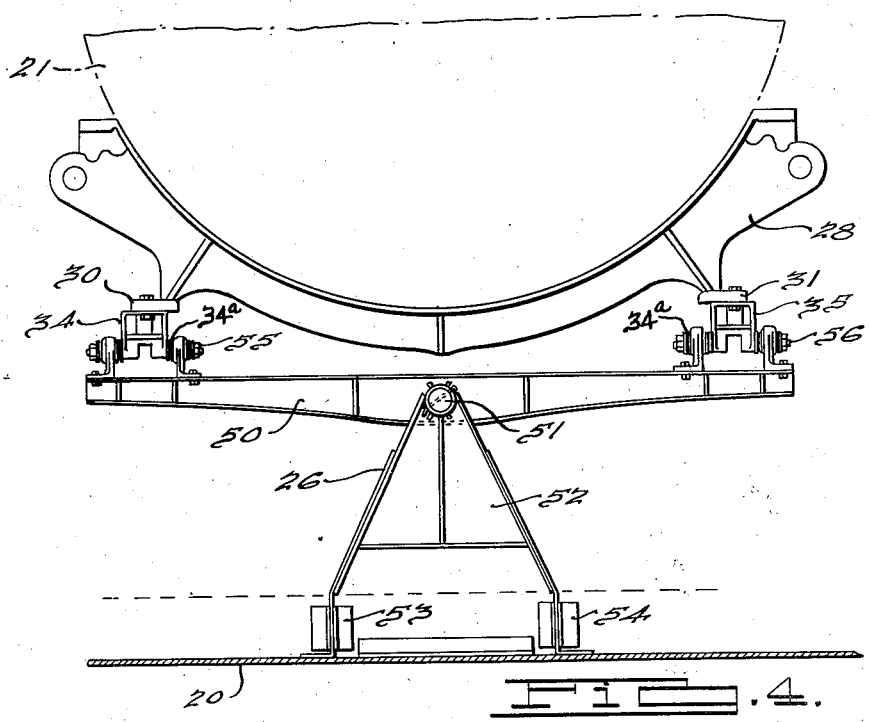
Fig. 4 is a view taken substantially on the line 4—4 of Fig. 1 and shows details of one of the supports for the fuselage structure.

The trailer illustrated herein is designed to be pulled by a truck on the highway and as to general classification of equipment might be the same general class of trailer as that previously used in the transportation of completed automobiles from the factory to the dealers. The vehicle herein described, however, has novel features developed with consideration of particular problems arising in the transportation of relatively large assembled units which must be carried without distortion. It is the intention for the structure herein disclosed that the sub-assembly parts for one airplane be carried in two trailer units. The general shape of the trailer is shown in Figs. 1, 6, 7 and 8, the same general frame structure being suitable for carrying the fuselage parts, which are shown loaded in the trailer of Fig. 1, as the trailer shown in Figs. 6, 7 and 8 which has supports for carrying wing sub-assemblies.

Although not detailed on the drawings, it is understood that the trailer bottom and sides are made up of structural members riveted together to form suitable girders to support the load between the trailer wheels and the point of support of the forward end of the trailer on the truck which carries the load, the portion of the trailer rearwardly of the wheels being designed to support that portion of the load as a cantilever.

Such features of the trailer are common to the two types herein described but each of the two trailers differ in the support structure built into them for supporting loads to be carried. For accomplishing the purpose of transporting the airplane herein considered two trailers are used to carry all parts of one plane, one trailer having support structures to carry fuselage sub-assemblies while the other trailer is fitted with suitable supports for carrying the major sub-assemblies of the wings. The disclosure of this application is primarily concerned with features of the support structure together with certain features of the removable tarpaulin top.

Tarpaulin top and supports therefor

The top of the trailer as shown in Figs. 1, 2 and 3 is made up of four removable tarpaulin bow cover units 15a, 15b, 15c and 15d, all noted in Fig. 1 while the numeral 15 is used generally in Figs. 2 and 3 to designate an assembly of the structure of one of the four tarpaulin bow cover units and as shown in these figures each of the bow assemblies 15 has two end cross bows or braces 16a, 16b, each of which terminate in downwardly projecting posts 17a, 17b. The longitudinal connecting members 18 and a center cross bow 18a form the assembly into a curved tarpaulin support cover unit with four downwardly projecting posts 17a, 17b which fit in sockets in the top longitudinal members 19a, 19b of the side frames of the trailer. A toggle hold-down clamping means 19c as shown in Fig. 3 is provided at each of the four posts 17a, 17b thus providing a positive means for securing each of the four tarpaulin bow cover units 15a to 15d to the top of the side frames of the trailer and allowing for their removal on actuation of the toggle 19c. Each of the tarpaulin bow cover units 15 has a tarpaulin or other covering material attached thereto of suitable size to cover the section of the trailer on which the bow fits, and with an overlapping portion which when the cover units are successively put in position on the top of the side frame members the overlapping portion extends onto the unit previously positioned thus assuring that the entire top will be covered without gaps between the successively positioned units. A portion of the tarpaulin also projects downwardly over each side of the trailer and is tied to a tie down strap or rod which extends along the top of the trailer below the top members 19a, 19b. It is therefore possible to quickly remove the top of the trailer for loading or unloading by separately removing the four tarpaulin bow cover units 15, each with a tarpaulin attached thereto.

Fuselage trailer

Referring to Fig. 1 a trailer 20 is shown which is of such size as to enclose two major sub-assembly parts 21 and 22 of an airplane fuselage with a smaller fuselage part 23 positioned in the upper part of the trailer. For the purpose of general description herein it may be advisable to state that the fuselage portion of an airplane is the main body portion in which the crew and load is carried and in cross section this fuselage is of an approximate oval shape. In the parts illustrated the sub-assembly 22 is the forward part of the fuselage while in the sub-assembly 21 is the rear portion and the smaller section 23 is located centrally of the fuselage relatively in the position in which it is shown in the trailer. It so happens that there is sufficient room remaining between the parts 21 and 22 and below the part 23 to carry boxes 24 containing motors. It is also possible, because of the tapering of the fuselage rear section to a smaller size, to carry parts of the vertical tail surfaces of the airplane at the sides of the fuselage in substantially the position shown at 25 in Fig. 1.

Figure 5:
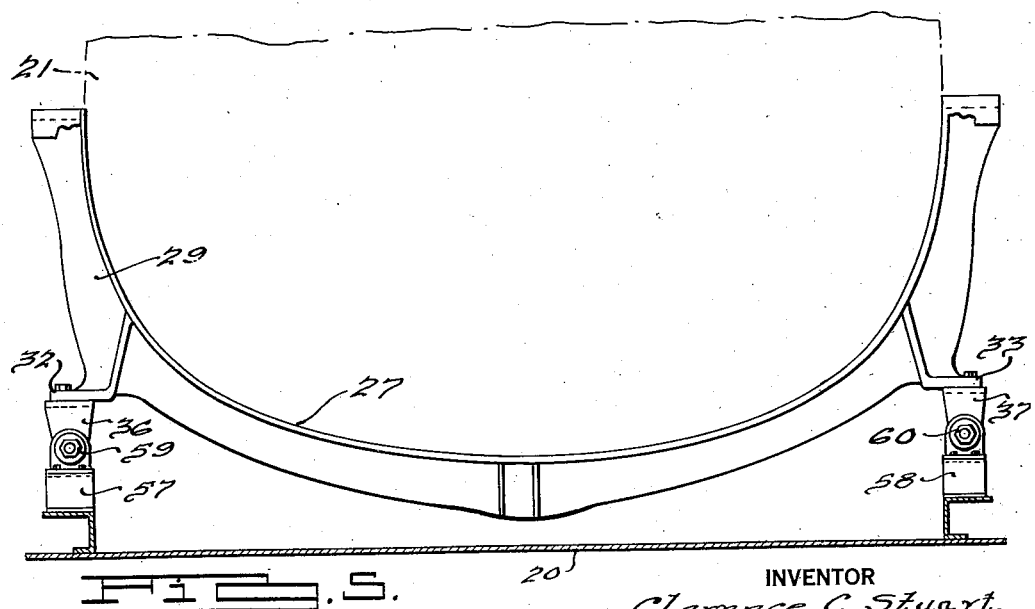
Fig. 5 is a view taken on the line 5—5 of Fig. 1 and shows other support structures positioned at the opposite end of the unit from that shown in Fig. 4.

Considering the means provided for supporting the fuselage sub-assembly 21, the view in Figure 1 shows a support 26 which is shown in more detail in Fig. 4 and a support 27, details of which are shown in Fig. 5. As is evident from the position of the supports 26, 27 shown in Fig. 1 the fuselage sub-assembly 21 is supported at two stations, details of which are shown in Figs. 4 and 5, respectively. As in the side view of Fig. 1 the cross sectional views of Figs. 4 and 5 show the fuselage sub-assembly 21 in dotted lines only and these figures also include only a showing of the lower portion of the fuselage cross section, it being understood that the section is substantially oval shape and its general configuration being evident on consideration of the dotted line showings of Figs. 1, 4 and 5. At the support 26 a bracket 28 is secured to the sub-assembly 21 and in practice it may be a fixture which is fastened to the unit during its manufacture for the purpose of transportation along a conveyor or other handling. It may be secured to the fuselage by any suitable means such as a clamp or straps surrounding the entire body or it may be secured in any other suitable manner which is not necessary to be shown herein, it being sufficient to state that the bracket 28 is positively secured to the fuselage sub-assembly 21. Also at the station 27 there is a bracket 29 performing a similar function and suitably shaped and secured to that portion of the sub-assembly, as shown in Fig. 5. Each of the brackets 28 and 29 located at the supports 26 and 27, respectively, have two horizontally disposed connecting members 30, 31 positioned adjacent the sides of the fuselage, the connecting members for the support 26 being formed on the bracket 28 as a part of the support 26 while the connecting members 32, 33 project from and are part of the bracket 29 of support 27, these details being shown on Figs. 4 and 5. The connecting members 30, 31 on bracket 28 are secured to seat brackets 34, 35, respectively, (Fig. 4) while connecting members 32, 33 are respectively connected to seat brackets 36, 37 (Fig. 5). These seat brackets 34, 35, 36 and 37 are all of the same general construction but differ in their mountings as will be described below. The seat brackets 34 and 35 are secured to the opposite ends of pivoted cross bar 50 extending transversely of the trailer, and pivoted on a center pin 51 supported on a bracket 52 which is in turn secured to suitable structural members 53, 54 on the floor of the trailer. On inspection of Fig. 4 it is evident that the fuselage at the station 28 is pivotally supported on the axis of pivot pin 51 and is free to tilt about the common axis of pins 55, 56 of the brackets 34, 35 which axis is above and at right angles to the axis of the pivot pin 51. The seat brackets 34 and 35 are mounted on the axes 55 and 56 with the rubber bushings 34a between the pins and the brackets and so have a limited freedom of movement restricted by the rubber bushings along the axes of pins 55, 56.

Considering the other station of support 27, shown in Fig. 5, the seat brackets 36, 37 are suitably secured to brackets 57, 58 near the sides of the trailer and are mounted on pins 59 and 60 which have axes substantially parallel to the longitudinal axis of the trailer and parallel also to the longitudinal axis of the fuselage. The pins 59, 60 are mounted in rubber bushings of the type shown in Fig. 10 of the drawings, which bushings project beyond the ends of the metallic bracket in which they are seated so that any movement of the fuselage along its longitudinal axis during transportation is taken up by a compression of the rubber bushings. Because of the rubber bushing in the seat bracket connection along the axes of pins 59 and 60, the fuselage at station 27 is therefore mounted with restricted movement along the axes 59, 60 longitudinally of the trailer, but it is substantially supported at two points through the seat brackets 36, 37 with the limited freedom of resiliently restricted movement allowed by the resilient rubber connections aforementioned.

It is apparent on consideration of Figures 4 and 5 and the relative positions of supports 26 and 27, as shown in Fig. 1, that the fuselage sub-assembly 21 has three major supports, i. e., (1) at the pivot pin 51 allowing freedom of tilt on an axis longitudinal of the trailer at the support 26 and (2), (3) at the seat brackets 36, 37 of support 27, and as a secondary support the seat bracket connections 34, 35, 36 and 37 all allow limited freedom of movement. It is also important that the pivot pins 55, 56 having a common axis substantially at right angles to the axis of the pivot pin 51 make the support at station 26 a universal connection, that is with freedom of tilt not only on an axis longitudinally of the trailer as above mentioned, but also on an axis at right angles thereto.

For the purpose of supporting the fuselage sub-assembly 22, a similar pair of supports 61, 62 are provided, the support 61 being similar to the support 27 of Fig. 5 and support 62 being in general similar to a support 26 of Fig. 4. These supports will not be illustrated in detail as their principle is the same as the supports for the fuselage sub-assembly 21, it being understood that appropriate changes in size and configuration of parts are made as necessary to conform to the position in the trailer and the size of the part to be supported. The small fuselage sub-assembly 23 and the motor boxes 24 are supported in the position shown. The sub-assembly 23 is secured on a frame supported by the two top members 19a, 19b thus securing it in the upper portion of the trailer.

In carrying large units of substantial length such as the fuselage sub-assemblies 21, 22 shown herein, it requires a relatively long trailer, and there will, of course, be some deflection of the trailer structure. Therefore the structural members carrying supports for the various parts of the unit will not always be in the same position relative to each other, a condition which if all supports were rigid would necessarily cause distortion of the structure carried as such relative deflections occurred during transportation of the load on the highway. However, it is apparent that with a mounting such as 26, having freedom of tilt about a longitudinal axis, such as the pin 51, the relative deflections of the two supports at station 27 will occur without transferring such deflections into a distortion of the structure carried but will simply allow limited movement of the entire structure. Also if as is the case at the station 26, the mounting is free to tilt both about the pivot pin 51 (a longitudinal axis), and also about the common axis of pins 55, 56 (a transverse axis) then any reasonable deflection of the trailer structure which could reasonably be expected would not cause distortion of the structure supported. Also if as is the case in the support structure disclosed, each of the supports connecting the fuelage to the trailer structure is provided with a resilient connection, the result will be a compensation for deflection of the necessarily long trailer structure by allowing certain relative movements of the load and cushioning of such movements by the resilient mountings above mentioned.

Wing trailer

The other trailer, of the two required to transport a complete airplane of the type herein used for illustration, is designated the wing trailer because of the fact that most of the parts carried therein are wing and control surface parts except for two motor boxes and some other smaller assemblies. The general frame structure of the trailer is the same as that previously described with reference to Fig. 1 except for the support brackets made necessary for supporting the wing assemblies which form the major part of the disclosure herein considered. There are three major wing sub-assembly units, i. e., the wing center section 75 and the two outer wing panels 76, 77. These three major sub-assemblies are positioned in the trailer in substantially the position shown in Figs. 6 and 7. Other smaller parts and sub-assemblies to be carried are distributed around the trailer as shown in Figs. 6 and 7, the supports for these units are not detailed in this disclosure, the supports for the main assemblies being of primary consideration herein. Of the parts merely indicated as to location the following are enumerated: motor box 78, gun turret 79, motor box 80 and bombardier enclosure 81.

In the airplane which this specific trailer is designed to carry, the wing center section 75 has motor mountings located in the leading edge thereof, there being four motors in all supported by the wing center section, two outboard motors on each half of the wing center section 75. When the wing center assembly is ready for transportation in this trailer, the motors are not assembled to the wing but are carried in boxes which have been previously mentioned. However, the motor mounting frame work is assembled on the wing center section and for the purpose of supporting the wing center section for transportation with its leading edge downward, suitable fittings are provided which attach to the two innermost motor mountings, these two supports for the wing center section are designated as 82, 83 in Figs. 6, 7 and 8 and it is evident from inspection of Figs. 6, 7 and 8 that the wing center section is carried on its leading edge and supported at 82 and 83. The side view of Fig. 8 shows more clearly the mounting for wing center section. Fig. 9 is a transverse section showing details of the support 82 and Fig. 10 shows the details of the support 83.

In preparing the wing center section 75 for transportation, a fixture 84 is secured to one of the inboard motor mountings corresponding to the position of the support 82, the shape of this fixture 84 in plan view is shown on Fig. 7. A similar fixture 85 is secured to the other inboard motor mounting corresponding to the position of support 83, the shape of this fixture is also shown in Fig. 7 and the cross section view in Fig. 10. A fixture support 86 is mounted on top of a bracket 87 as shown in Fig. 9 and has a projecting member 88 secured thereon positioned to locate in a flanged opening 89 in the fixture 84. The bracket 87 has a socket 90 formed thereon to receive a ball 91 completing a ball and socket joint, the ball 91 being secured to a shaft 92 which is secured to channel members 93, 94 extending longitudinally of the trailer. The shaft 92 is provided with resilient mountings 95 so that although the shaft is restricted against sliding movement across the trailer, it is still able to move a limited amount in that direction as allowed by the resilient mounting. The mounting unit and the ball and socket joint 90, 91 assure that the mounting can tilt in all directions, the wing center section 75 being restrained, however, at the other support 83 which is shown in Fig. 10 and it is apparent on inspection of that figure that the fixture 85 which is secured to the motor mounting is held on a fixture support 96 which has a projection 97 secured at its center. The fixture 85 has a flanged central opening to receive the support bracket mounted on short shafts 98, 99 with resilient mountings between such shafts and trailer structure members 100, 101. The supporting connections between the fixture support 96 and the shafts 98, 99 is effected by downwardly extending brackets 96a, 96b each of which have a bushing 96c, 96d secured thereto, the bushings 96c and 96d being of a size to fit upon the projecting ends of the shafts 98, 99. This construction will be understood in reference to Fig. 10 where it also appears that the brackets 96a and 96b are so positioned that a small amount of sliding movement is allowed on the shafts 98, 99 so that in addition to the resilient mounting of the shafts 98, 99 above referred to, the fixture support 96 also has a limited freedom of sliding movement transversely of the trailer resiliently terminated by contact with the mountings as shown which provides an advantage in allowing the wing to be positioned without distortion. The result of the mounting by supports 82 and 83 is a freely tilting support around the ball socket joint at support 82 and a restricted two point support by shafts 98, 99 at support 83. The projections 88 and 97 being tapered to fit in the central flanged openings in the support fixtures 84 and 85, assure that it will be possible to set the wing on the support brackets 86 and 96 without too great difficulty. In order to steady the wing in its on-edge position, a central stay bracket 102 is secured to the side of the trailer as shown in Fig. 8, this stay bracket is preferably in the form of a strap surrounding the wing and merely steadies the wing section at the center and carries only a small portion of the load, the major portion of the load being carried on the two supports 82, 83.

For the purpose of supporting the outer wing panels, two of which are carried in the trailer and which form two of the three major assemblies to be transported, there is provided a support structure 110 (Figs. 6 and 7) positioned near the rear end of the trailer and secured to the floor members thereof. Details of this structure are shown in Figs. 11 and 12 where four frames 111, 112, 113 and 114 are shown extending upwardly from the trailer floor being secured to cross members 115, 116 on the trailer. Two pivotally mounted beam members 117, 118 are mounted on a bracket 119, 120, a pivot for each of the beam members 117, 118 being provided by pins 121, 122 which are removable from the bracket by removing keys as shown. The beam members 117, 118 are for the purpose of securing the inner or root ends of the wing panels exactly as they would be secured to the wing center section and thus when the two wing panels are in place they are held on the two beams 117, 118 as a cantilever structure. The wings are thus supported by the same fastenings as would be used to secure them in place on the airplane center section in actual flight except that they are parallel to each other and on edge as will be apparent on inspection of Figs. 6 and 7. In order to prevent the beam members 117, 118 from swinging downwardly between the frames 111, 112, 113 and 114, stop members 123 are provided, one of which is shown in Figure 11. Therefore when the wing panels are fastened at their inner root ends to the beams 117, 118 and when their weight causes the beams to pivot to the extent allowed by the stops 123 the wings are therefore held as cantilever structures by the frames 111, 112, 113 supported above the floor. In order to steady the wings a saddle bracket 124, shown in Fig. 13, placed in the trailer in the location indicated in Fig. 6 is provided. This bracket is merely a double saddle having two recessed parts 125 and 126 carried between suitable support members as shown in Fig. 13. The function of this support, however, is merely a steadying support and is so positioned that the major load is taken on the support bracket 110 through beam members 117, 118 as above described.

On consideration of the above description of the supports for the three major wing sub-assemblies, it is apparent that in all cases the support connections are made in such a manner that the structures of the wings are stressed only in the manner in which they are designed to be stressed since connections at the supports are in all cases made at points where either relatively heavy loads are carried, as in the case of the motor mounting connections for the center section, or at the root ends of the outer wing panels which are designed to carry not only the weight of the wings themselves but also the relatively far greater air load which is imposed upon them during flight. Therefore by supporting the outer wing panels at their root ends and allowing them to overhang from such supports as cantilever structures, there is no danger of distorting them since they are being supported in the same manner that they are actually designed to withstand in use. It is evident on inspection and comparison of the supports for the wing center section and the supports for the fuselage structures, that these support methods are substantially equivalent while the supports for the wing center section and the outboard panels have the common feature of using structural parts of the units as support connections.

It is to be noted that the cross bows or braces 16a, 16b, in addition to serving as a support for the tarpaulin top units, also serve as structural cross braces for the longitudinal side frames of the trailer. The seating of the tapered extremities or posts 17a, 17b into the similarly shaped sockets provided in the top longitudinally extending members 19a, 19b of the side frames of the trailer in combination with the toggle hold down clamping means 19c insuring a tight rigid fastening of the cross bows to the side frame members and as there are eight of such side frame members in the construction as shown arranged at spaced intervals from the front to the rear of the trailer, the cross bows 16a, 16b therefore act as structural elements to hold the top of the side frames in properly spaced position laterally of the trailer.

Although the structures herein disclosed have been particularly designed for transporting airplane sub-assemblies, (and a few of the features are specific to such use) it is evident that equivalent support structures might be advantageously used with only minor changes for supporting other loads of similar character requiring transportation with minimum of distortion. It is therefore contemplated that various changes and modifications will be made within the scope of the following claims.

1. Dunnage means for supporting a load for transportation on a vehicle comprising a pair of supporting stations spaced longitudinally of said load, two pairs of seat brackets one pair spaced transversely of said load and secured thereto at a position above each of said stations, a cross bar at one of said stations and extending transversely of said load, a pivotal mounting connecting said cross bar to said vehicle under said load and centrally thereof, connections between the ends of said cross bar and said pair of seat brackets whereby said load is pivotally mounted at said station, means connecting the pair of seat brackets at the other of said stations to said vehicle.

2. Dunnage means for supporting a load for transportation on a vehicle comprising a pair of supporting stations spaced longitudinally of said load, one of said stations providing a universal mounting between said load and said vehicle allowing freedom of transverse and longitudinal tilt, the other of said supporting stations having connections between said load and said vehicle allowing resiliently restricted movement of said load.

3. The combination with a transport vehicle of means for supporting a readily distortable structure of considerable length, such as an airplane part, for transportation in said vehicle, said means comprising a pair of supports spaced longitudinally of said vehicle for engagement with the under-side of said part, one of said supports comprising a single bracket located substantially in the vertical plane in which the center of gravity of the part to be carried is located, a supporting fixture carried by said bracket for engagement with said load and universal connections between said fixture and bracket and the other of said supports comprising a pair of brackets spaced transversely of said vehicle and the part to be carried and supporting means for engaging the bottom of the part to be carried, carried by said pair of brackets and means for connecting said supporting means to said brackets for permitting limited lateral movement of said load, said supports providing a three point suspension for the part to be carried which permits limited longitudinal and lateral movement of the part to compensate for both vertical and lateral weaving motion of the vehicle without distortion of the part being transported.

4. The combination with a transport vehicle of dunnage means for supporting a readily distortable structure of considerable length, such as an airplane part, for transportation by said vehicle from a shipping point to a receiving point, said means comprising a pair of supports spaced longitudinally of said vehicle for engagement with the underside of said structure, a single bracket rigidly secured to said vehicle beneath one of said supports, a pivotal connection between said bracket and said one support located substantially in the vertical plane in which the center of gravity of the part to be carried is located for allowing pivotal movement of said support relative to said bracket about an axis extending longitudinally of said part and said vehicle, additional pivotal connections between said bracket and support for allowing pivotal movement of said support upon an axis extending transversely of said part and said vehicle, a pair of transversely spaced brackets located below the other of said pair of supports and resilient connections between said other support and pair of brackets for permitting limited lateral and longitudinal movement of said other support and the load carried thereby.

5. The combination with a transport vehicle of dunnage means for supporting a readily distortable structure of considerable length for transportation, comprising a pair of supports for engaging the underside of said load, said supports being shaped to conform to the shape of the load at the place of support and upon which said support said structure non-attachably rests, a single bracket attached to said vehicle located below one of said supports substantially in the vertical plane in which the center of gravity of said load is located, pivotal connecting means between said support and said bracket for permitting both lateral and longitudinal pivotal movement of said support relative to said bracket, a pair of transversely spaced brackets located below the other of said pair of supports and means for connecting said bracket to said other support for limited longitudinal and lateral movement.

6. The combination with a transport vehicle of dunnage means for supporting a readily distortable load of considerable length for transportation, said means comprising a pair of longitudinally spaced supports for engaging the underside of said load, a single bracket located substantially in the vertical plane in which the center of gravity of said load is located, connections between said one of said supports and said bracket for allowing substantially universal movement between said support and bracket, a pair of transversely spaced brackets interposed between said other support and the vehicle and resilient means interposed between said pair of brackets and said other support for allowing restricted lateral and longitudinal movement of said support and the load carried thereby relative to said vehicle.

CLARENCE C. STUART.